United States Patent [19]
Jensen

[11] 3,882,402
[45] May 6, 1975

[54] CIRCUIT FOR TRANSMITTING VELOCITY SIGNALS DERIVED FROM POSITION SIGNALS

[75] Inventor: Dale J. Jensen, Chelmsford, Mass.

[73] Assignee: Digital Equipment Corporation, Maynard, Mass.

[22] Filed: Feb. 26, 1973

[21] Appl. No.: 335,895

[52] U.S. Cl. ............ 328/13; 324/165; 328/127; 328/132; 328/133; 328/158
[51] Int. Cl. ... H03b 19/00; G01p 3/52; G01p 13/00
[58] Field of Search ....... 328/13, 26, 127, 114, 132, 328/133, 134, 155, 156, 158; 324/163, 165, 173

[56] References Cited
UNITED STATES PATENTS

| | | | |
|---|---|---|---|
| 3,094,666 | 6/1963 | Smith | 328/133 |
| 3,253,218 | 5/1966 | Mayer | 324/173 |
| 3,603,869 | 9/1971 | Neuffer et al. | 324/163 |
| 3,728,565 | 4/1973 | O'Callaghan | 324/165 |
| 3,745,473 | 7/1973 | Klein et al. | 328/133 |

Primary Examiner—Stanley D. Miller, Jr.
Attorney, Agent, or Firm—Cesari and McKenna

[57] ABSTRACT

A rate signal generator for a second order servomechanism. A position transducer generates at least two phase-displaced sinusoidal position signals. These signals synchronize a multi-phase clock which generates a plurality of mutually exclusive clocking signals, one clocking signal being centered on each zero crossing for a position signal. Gated differentiator circuits are responsive to the clocking signals at respective position signal zero crossings to generate signals representing the derivative of each position signal. A summing circuit combines the individual gated derivative signals and generates a DC rate signal. The magnitude of this rate signal indicates speed; the polarity, direction.

6 Claims, 6 Drawing Figures

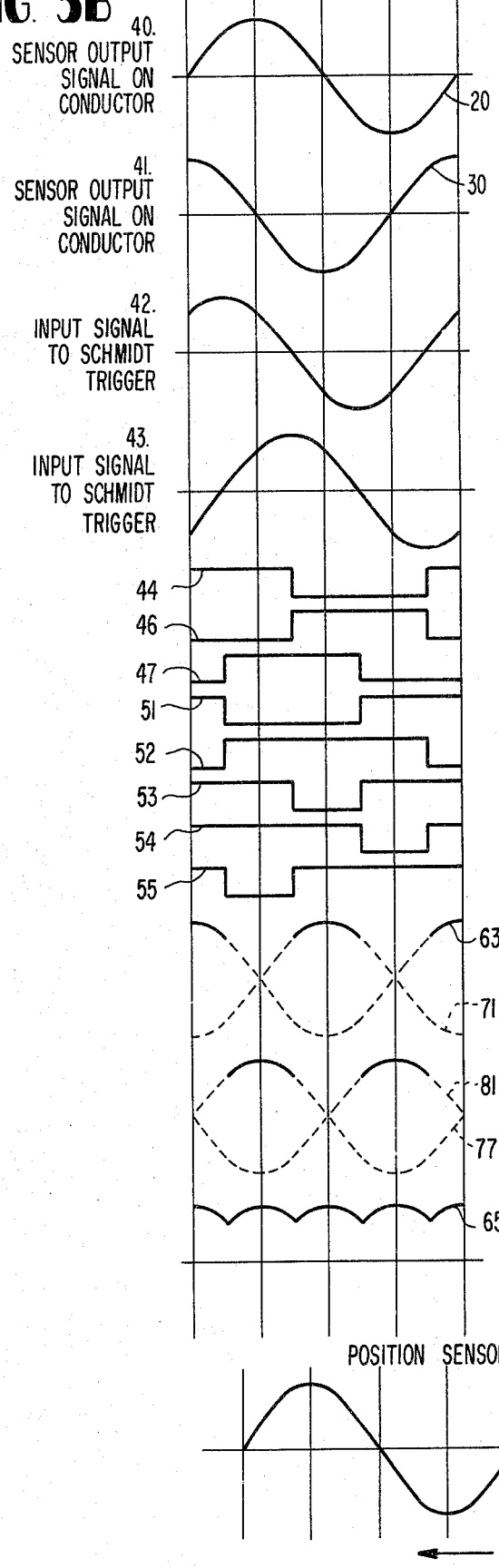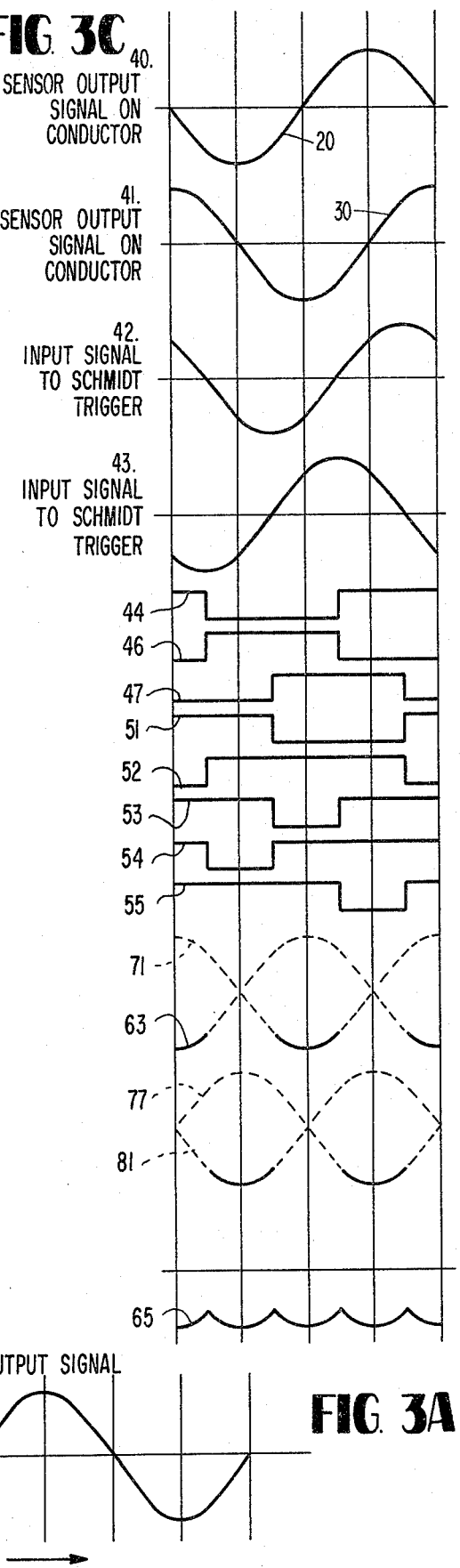

CIRCUIT FOR TRANSMITTING VELOCITY SIGNALS DERIVED FROM POSITION SIGNALS

BACKGROUND OF THE INVENTION

This invention generally relates to velocity generators for servo-mechanisms and particularly to velocity generators adapted for use in control circuits for positioning heads in movable head magnetic disk or drum systems.

In movable head systems, a positioner moves reading/writing heads to a designated track containing information. Usually, an optical or mechanical incremental transducer produces position signals. A positioning servo-mechanism uses these position signals and correlates the actual and desired positions of the heads.

In one system, a counter stores the number of tracks between the actual and desired positions. As the heads move, a movable reticle in an optical diffraction system passes a stationary reticle. Conventional photo-electric means and associated circuits generate an AC output signal with zero crossings corresponding to the passage of each track. Each track crossing causes the counter to be decremented. When a counter contains a zero, the heads are properly positioned.

It is desirable to monitor and control head velocity to minimize head transfer times. There is some maximum velocity limit which the physical structure determines. To avoid hunting and damping motions, the head velocity must decrease as the heads reach the desired point. If a secondorder servo-mechanism controls head movement, the heads ideally decelerate to a zero velocity just as they move over the desired track.

Some means must provide the velocity information in these systems and many systems use a separate velocity generator. A popular generator is a conventional electro-mechanical tachometer generator.

Another type of velocity generator uses spaced position sensors. When a first sensor produces a zero count in an associated counter, the system decelerates and positions the head in accordance with a second set of sensors and associated counters.

In still another velocity generator an electro-optical system generates a carrier signal. The carrier frequency varies with velocity and circuitry responds to these frequency changes to produce velocity information.

Another system uses a "solenoid type" velocity signal generator. In this system, a head transport carries a moving magnet for movement in a solenoid coil which a stationary member carries. As the magnet moves, it generates a voltage which varies in both polarity and magnitude to indicate head direction and speed, respectively.

Each of these prior systems uses a separate velocity generator. The magnitude of the velocity signals in each decreases as the velocity desreases so that the velocity signal becomes difficult to monitor at low velocities. Unfortunately, this occurs at the very time it is important to have a valid velocity signal. Furthermore, the additional elements which are necessary to generate the velocity signal add to the complexity and cost of the disks or drums.

Therefore, it is an object of this invention to provide a velocity control circuit which minimizes the number of transducers in the system.

Another object of this invention is to provide a simplified second-order servo-mechanism for controlling head position.

Yet another object of this invention is to provide a second-order servo-mechanism for rotating magnetic memories which optimizes the velocity signal, especially near zero velocity.

SUMMARY

In accordance with my invention, position transducer means generate a plurality of phase-displaced sinusoidal position signals. These position signals synchronize a multi-phase clock which generates mutually exclusive clocking signals for each position signal zero crossing. Clocked differentiation means then sample the position signals at their respective zero crossings when the differentiated signals are at a maximum. Summing means combine the differentiated position signals and generate a DC velocity signal.

The generated velocity signal looks like the signal a standard tachometer generates. Its polarity indicates direction, while its magnitude varies with speed. If an electro-optical system generates the position signals, the position signals are insensitive to electromagnetic noise, so the velocity signals are also insensitive to noise.

This invention is pointed out with particularity in the appended claims. A more thorough understanding of the above and further objects and advantages of this invention may be attained by referring to the following description taken in conjunction with the accompanying drawings.

BRIEF DESCRIPTION OF THE DRAWINGS

FIG. 3 comprises FIGS. 3A, 3B and 3C which are timing diagrams to show the relationship of certain signals in the velocity generator shown in FIG. 2.

DESCRIPTION OF ILLUSTRATIVE EMBODIMENTS

Figure 1:
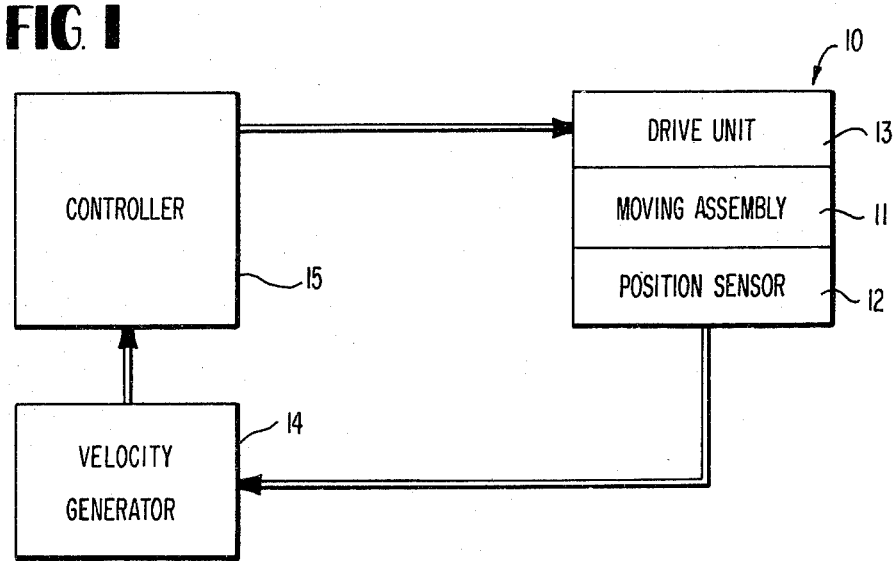
FIG. 1 is a block diagram of a servo-mechanism embodying this invention.

Referring to FIG. 1, a direct access memory 10 includes a moving assembly 11 for positioning heads. A position sensor 12 monitors any head movement while a drive unit 13 actually positions the heads. A velocity generator 14 passes signals from the position sensor in modified and unmodified forms to a controller 15 which completes a second-order servo-mechanism loop. In turn, the controller 15 transmits signals to the drive unit 13.

The assembly 11 can comprise any one of many known types of mechanisms. By way of example, the position sensor 12 may comprise stationary and movable reticles which control the passage of light from a lamp to a photocell array. The array produces two sinusoidal signals which are displaced by 90° electrically. Hence, if one signal varies as a sine function, the other signal varies as a cosine function. Furthermore, reticle gratings are spaced so that 1 cycle of each signal corresponds to a movement of one track on the disk or drum.

The controller 15 generates a variable magnitude, reversible polarity driving signal to activate the drive unit 13. One common drive unit 13 utilizes a voice coil as an armature so the voice coil and attached heads move when energized. As apparent, the voice coil direction of movement is controlled by the polarity of the driving signal while its speed depends upon the driving signal magnitude.

Figure 2:
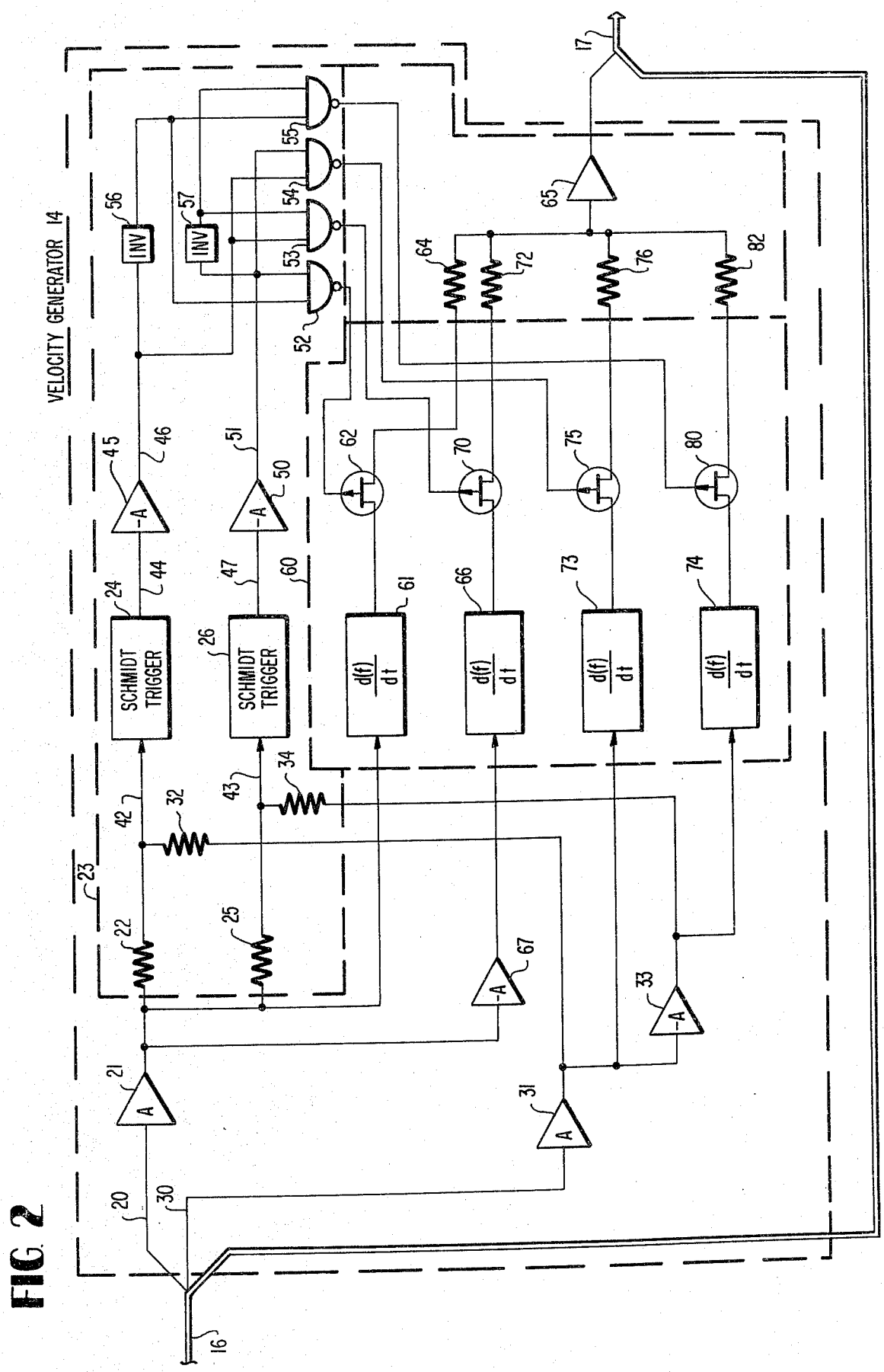
FIG. 2 is a detailed schematic diagram of the velocity generator shown in FIG. 1.

As shown in FIG. 2, position signals enter the velocity generator 14 on a bus 16 and pass directly to an output bus 17 to the controller 15. In addition, the position signals pass through the velocity generator 14 to generate velocity signals for the controller 15.

Specifically, a sine signal appears on an input conductor 20 to an amplifier 21 which, with other amplifiers serves as an input means or receiving the position signals. A first resistor 22 in a multi-phase clock circuit 23 couples the amplified sine signal to a conventional Schmidt trigger circuit 24. Another resistor 25 couples the amplified sine signal to a Schmidt trigger 26.

A cosine signal appears on an input conductor 30 to an amplifier 31 in the input means. A resistor 32 couples the amplified cosine signals to the Schmidt trigger 24 to be summed with the sine signal. An inverting amplifier 33 and a resistor 34 supply an inverted cosine signal to the Schmidt trigger 26 to be summed with the sine signal. Hence, the circuitry described thus far produces an input signal for the Schmidt trigger 24 on the conductor 42 which is:

$$e_{42} = \sin x + \cos x = k \sin (x+45°)$$

while the Schmidt trigger 26 input on a conductor 43 is:

$$e_{43} = \sin x - \cos x = k \sin(x-45°)$$

where $k$ is a constant and $x$ represents the position signals.

Referring now to FIG. 3A, the sine signal is shown as the heads move from a given position ($\Delta=0$). As the heads move to the right (in a positive direction) from $\Delta=0$, the sine signal increases from zero on a positive direction. Movement in the other direction from $\Delta=0$, (to the left) produces an increasing signal in a negative direction.

Graphs 40 in FIGS. 3B and 3C show the time variation of the signals on input conductor 20 assuming both start at $t = 0$ from $\Delta=0$. Hence, FIG. 3B represents the signals with respect to time as the heads move from one track to the next in a positive direction while FIG. 3C represents head movement from one track to the next in a negative direction.

Still referring to FIG. 3, Graphs 41 represent corresponding variations of the cosine signals on conductor 30 with time. Graphs 42 represent the $e_{42}$ input signal on conductor 42 to Schmidt trigger 24 (FIG. 2). This input is sinusoidal and leads the sine wave by 45°. Graphs 43 illustrate variations in the $e_{43}$ input signal on conductor 43 to Schmidt trigger 26. In this specifically described embodiment and with these specific circuit conditions, the Graph 43 in FIG. 3B lags the sine wave by 45°. A reversal in head position causes the input voltage $e_{43}$ to the Schmidt trigger 26 to lead the sine wave by 45°, as shown by Graph 43 in FIG. 3C.

In the following discussion, one reference numeral identifies a conductor and the signal on that conductor or a circuit and the output signal from that circuit.

Referring to FIG. 2, the output from Schmidt trigger 24 on conductor 44 is shown in FIGS. 3B and 3C as a zero assertion signal 44. Hence, the signal is at a ground potential whenever the input 42 is negative. An inverting amplifier 45 (FIG. 2) produces the inverted output on a conductor 46 as shown by Graphs 46 in FIGS. 3B and 3C. Graphs 47 show how the Schmidt trigger 26 operates in response to its input signal while Graphs 51 illustrates the output from an inverting amplifier 50. As apparent, a reversal in head direction alters the sequence during which these signals are asserted and this reversal enables NAND circuits to generate mutually exclusive phase outputs which are synchronized to the position signals.

Reference numerals 52, 53, 54 and 55 identify four NAND circuits. Signals from the amplifier 50 and from an inverter 56 which amplifier 45 drives, energize NAND circuit 52. Hence, the NAND circuit 52 produces a zero assertion output for 90° and this signal centers on the positive-going zero crossing for the sine wave as shown in Graph 40 (FIG. 3B) and the negative-going zero crossing as shown in FIG. 3C. NAND circuit 53 receives signals from amplifier 45 and an inverter 57 which amplifier 50 drives. The zero assertion signal also is 90° in length, but it centers on the other zero crossing of the sine wave shown in Graphs 40.

Amplifiers 45 and 50 both energize NAND circuit 54. Its zero assertion signal centers on the positive going crossing of the cosine signal (Graphs 41 and 54 in FIG. 3B). The other NAND circuit 55, which the inverters 56 and 57 energize, produces a zero assertion signal that centers on the negative-going zero crossing of cosine wave (Graphs 41 and 55 in FIG. 3B) and the positive-going crossing in FIG. 3C. Hence, the outputs of the NAND circuits 52, 53, 54 and 55 produce four phase signals which are mutually exclusive; and each is centered on a zero crossing of one of the two position signals 40 or 41. The Schmidt trigger circuits, NAND circuits and associated circuit components therefore constitute the multi-phase clocking circuit 23.

A gated differentiation circuit 60 receives the various position signals. Differentiator circuit 61 produces an output which is the derivative of the sine wave 40. NAND circuit 52 turns on a field effect transistor (FET) 62 at the time showed by Graph 52 in FIG. 3B. During this interval, the portion of a cosine wave, which is the derivative of the sine wave and which is shown in solid portion on Graph 63, exists. A resistor 64 couples this signal to a summing circuit 65.

A differentiator circuit 66 receives the inverting amplifier sine signal from an inverter 67 in the input means. A FET 70 and summing resistor 72 couple gated signal, represented by the solid portion of Graph 71 shown in FIG. 3B to the amplifier 65.

A differentiator circuit 73 receives the cosine signal from the amplifier 31 while a differentiator circuit 74 receives the inverted cosine signal from the inverting amplifier 33. A FET 75 connected to NAND circuit 54 and resistor 76 couple the cosine signal which exists while the position cosine signal is going through the positive-going zero crossing to the summing circuit 65, the signal being represented by the solid portion of Graph 77. Similarly, a FET 80 gates the solid portion of the signal shown by the solid portion in Graph 81 to the summing amplifier 65 through a coupling resistor 82. Hence, the output from the summing circuit 65 is the sum of the signals shown by the solid portions of graph 63, 71, 77 and 81.

As can be seen from FIG. 3B, the signal 65 from a summing circuit 65 appears as a rectified, unfiltered DC output signal. As apparent, increases in velocity increase the signal magnitude, but the polarity does not change. Likewise, as head speed decreases, the frequency of the position signals and their corresponding derivatives decrease in magnitude.

As apparent in FIG. 3C, reversing the head direction alters the sequence during which the mutually exclusive phase signals are all at their positive maximums when clocked; in FIG. 3C, they are all at their negative maximums. At the same velocity, the polarity of the signal from the summing circuit 65 reverses, but again appears as a rectified, unfiltered DC output signal.

Field effect transistors 61, 66, 73 and 74, or their equivalents, have essentially a zero impedance when conducting and an effectively infinite impedance while not conducting. These characteristics further improve velocity signal accuracy because the circuit does not attenuate the signals and because the FET's effectively isolate the differentiators at all other times. The phase signals assure that the velocity signal has a maximum amplitude. Hence, the velocity generator 14 produces accurate velocity signals for the controller 15 (FIG. 1).

There are many variations of the circuit shown in FIG. 2. One variation appears in FIG. 4 wherein like numerals represent like elements.

An amplifier 21 receives the sine signal in conductor 20 and energizes Schmidt trigger circuit 24 through resistor 22 and the Schmidt trigger circuit 26 through resistor and inverter 67. An amplifier 31 couples the cosine signal on conductor 31 to Schmidt trigger 24 through resistor 32. An inverter 33 and resistor 34 provide an inverted cosine signal to Schmidt trigger circuit 26.

The outputs of the Schmidt triggers are the same as those shown in FIG. 3. However, in this case, they connect to switched amplifier circuits which operate as described below.

Amplifier 21 also drives a differentiator circuit 61 while amplifier 31 drives a differentiator circuit 73. The other pair of differentiator circuits shown in FIG. 2 are not necessary in this embodiment. Differentiator circuit 61 drives amplifier 80 and an inverting amplifier 81 while differentiator circuit 73 drives an amplifier 82 and an inverting amplifier 83. The outputs of all the amplifiers connect to the summing circuit 65.

Each switched amplifier has a pair of selection input terminals which respond to binary type signals. Using a "1" to denote a zero assertion signal, the amplifiers connect to the Schmidt trigger circuits 24 and 26 to conduct when the input signals are as follows:

| Amplifier | Schmidt trigger 24 | Schmidt trigger 26 |
|---|---|---|
| 80 | 1 | 0 |
| 81 | 0 | 1 |
| 82 | 0 | 0 |
| 83 | 1 | 1 |

With these connections, the output signal from the summing circuit 65 is identical to that shown in FIG. 3. Considering the signals in FIG. 3B, it is apparent that amplifier 80 is active while the sine signal is going through its positive zero crossing. The differentiator circuit 61 produces a positive differential signal at that time. At the other zero crossing, the differentiator circuit 61 generates a negative signal, but the amplifier 81 is active and inverts it back to a positive polarity. When head direction changes, the amplifiers operate to reverse the polarity of the summed output signal.

Figure 4:
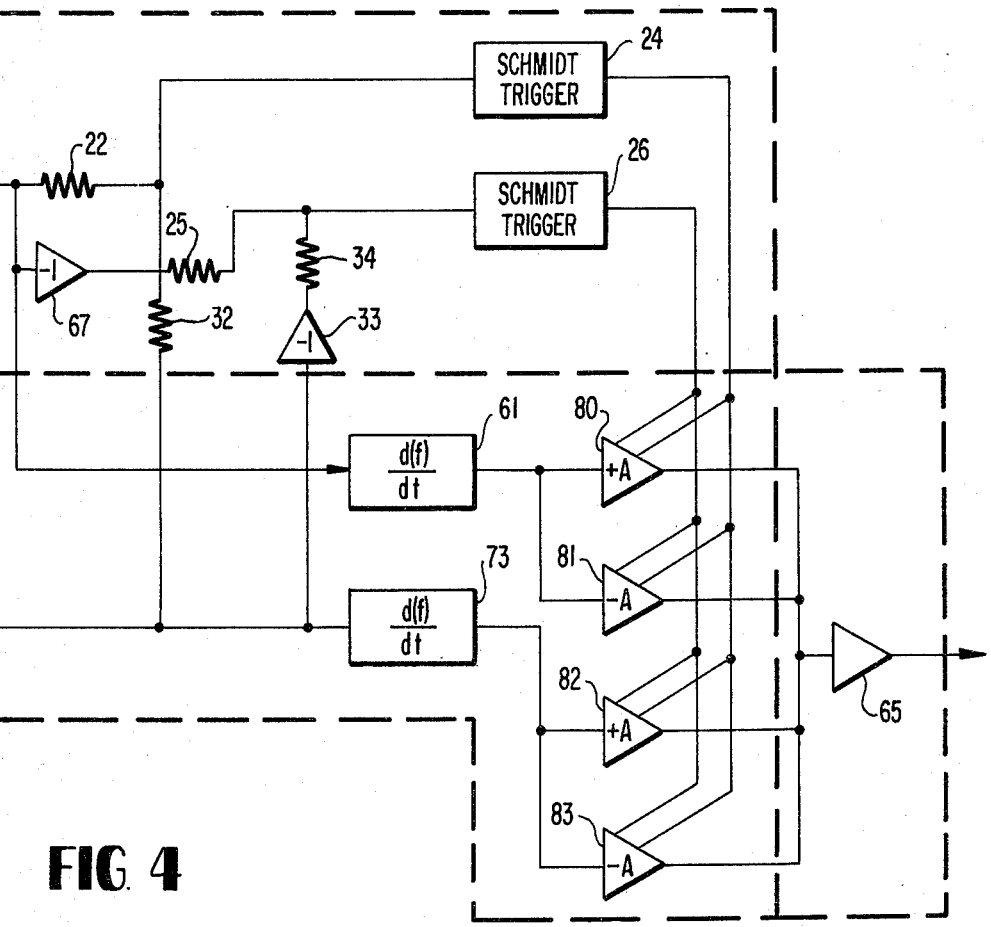
FIG. 4 is an alternate embodiment of the velocity generator shown in FIG. 1.

There are still other variations of the circuits shown in FIGS. 2 and 4. While I have elected to use four clocking pulses, each having a duration of 90°, other numbers of clocking signals can be used with appropriate changes. In any embodiment, however, the number of phase signals and the duration of each phase signal are selected so that the phase signals are mutually exclusive and so that one phase signal always asserts. Further, each phase signal is centered on a zero crossing of a position signal so that a maximum derivative signal results.

In view of these and other modifications which are apparent to those skilled in the art, it is the object of the appended claims to cover all such variations and modifications as come within the true spirit and scope of this invention.

What I claim as new and desire to secure by Letters Patent of the United States is:

1. A velocity signal generator responsive to a plurality of phase displaced cyclical sinusoidal position signals for transmitting a velocity signal, said generator comprising:
   A. input means for receiving the position signals,
   B. multi-phase signal means connected to said input means for generating a plurality of mutually exclusive phase signals synchronized to the position signals, one phase signal being associated with each zero crossing for each position signal,
   C. gated differentiating means connected to receive each position signal for generating a differentiated position signal as an output signal during intervals determined by a corresponding one of the phase signals, the output signals having the same polarity, and
   D. means for summing the output signals from said gated differentiating means, said summing means thereby transmitting the velocity signal.

2. A velocity signal generator as recited in claim 1 wherein said multi-phase signal means comprises:
   i. means for combining the position signals to obtain signals representing the sum and difference of the position signals,
   ii. means responsive to the sum and difference signals for generating binary signals, and
   iii. a decoder responsive to the binary signals for generating the phase signals.

3. A velocity signal generator as recited in claim 2 wherein said binary signal generating means comprises a plurality of Schmidt trigger circuits.

4. A velocity signal generator as recited in claim 1 wherein said differentiating means comprises a pair of differentiating circuits for each position signal, means connecting each position signal to each corresponding differentiating circuit and output means for gating signals from said differentiating circuits in response to the phase signals.

5. A velocity signal generator as recited in claim 1 wherein
   A. said differentiating means comprises a first differentiator connected to receive a first position signal and a second differentiator connected to receive a second position signal and inverting and noninverting amplifying means connected to the output of each said differentiators to receive signals therefrom, each of said amplifiers coupling a signal therethrough in response to a gating signal; and B. means for connecting phase signals to said amplifier means to control coupling of signals therethrough.

6. A velocity signal generator as recited in claim 5 wherein said multi-phase signal means comprises a pair of Schmidt triggers, the outputs of each of said Schmidt trigger circuits being connected to a control input of each of said amplifier means, conduction of the Schmidt triggers thereby controlling the coupling of signals through said amplifier means in a mutually exclusive fashion.

* * * * *